(12) United States Patent
Henry et al.

(10) Patent No.: US 9,144,190 B2
(45) Date of Patent: Sep. 29, 2015

(54) PARTICULATE MATERIAL DELIVERY SYSTEM FOR VARIABLE RATE SECTIONAL CONTROL

(71) Applicant: CNH Canada, Ltd., Saskatoon (CA)

(72) Inventors: James W. Henry, Saskatoon (CA); Graham D. Stuart, Saskatoon (CA); Evan J. B. Wolowski, Saskatoon (CA); Matthew G. Petruic, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 84 days.

(21) Appl. No.: 13/746,105

(22) Filed: Jan. 21, 2013

(65) Prior Publication Data

US 2013/0192503 A1    Aug. 1, 2013

Related U.S. Application Data

(60) Provisional application No. 61/589,565, filed on Jan. 23, 2012.

(51) Int. Cl.
*A01C 7/04*      (2006.01)
*A01C 7/08*      (2006.01)
*A01C 7/10*      (2006.01)
(Continued)

(52) U.S. Cl.
CPC .................. *A01C 7/044* (2013.01); *A01C 7/082* (2013.01); *A01C 7/102* (2013.01); *A01C 7/127* (2013.01); *E02F 9/2095* (2013.01)

(58) Field of Classification Search
CPC .......... A01C 7/102; A01C 7/105; A01C 7/10; A01C 7/082; A01C 7/084; A01C 7/081; A01C 7/08; A01C 7/127; A01C 7/126; A01C 7/12; A01C 7/20; A01C 7/044; A01C 7/04; A01C 7/00; E02F 9/2095; E02F 9/2058; E02F 9/20; E02F 9/00; B60R 16/0231; B60R 16/023
See application file for complete search history.

(56) References Cited

U.S. PATENT DOCUMENTS 5,003,894 A    4/1991   Lafferty
5,078,066 A    1/1992   Lafferty
(Continued)

FOREIGN PATENT DOCUMENTS

DE        202005002495      2/2005
WO    WO 2007083932 A1 *   7/2007

OTHER PUBLICATIONS

The Dakota Lakes Staff, Multiple Section Control Row Planters, Seeders, Drills, and Fertilizer Spreaders; http://www.dakotalakes.com/Publications/12-2007/11%20Individual%20Row%20Corn%20Planter%20Control%202005.pdf.

*Primary Examiner* — Christopher J Novosad
(74) *Attorney, Agent, or Firm* — Rebecca L. Henkel

(57) ABSTRACT

A particulate material delivery system is provided that allows for variable rate sectional control while delivering particulate material to an agricultural field. The system may include an air cart and a drill that are towable behind a tractor and that includes a metering system receiving product from the air cart and delivering the product to the drill for distribution to the ground, such as an agricultural field. The metering system includes multiple metering units that receive separate portions of the product from the air cart. Multiple prime movers drive the multiple metering units. A controller is connected to and individually controls the multiple prime movers such that distribution rates of the multiple metering units can be varied independently of each other.

6 Claims, 9 Drawing Sheets

(51) Int. Cl.
 *A01C 7/12* (2006.01)
 *E02F 9/20* (2006.01)

(56) References Cited

U.S. PATENT DOCUMENTS

| | | | |
|---|---|---|---|
| 5,189,965 | A | 3/1993 | Hobbs et al. |
| 5,996,515 | A | 12/1999 | Gregor et al. |
| 6,192,813 | B1 | 2/2001 | Memory et al. |
| 6,240,861 | B1 | 6/2001 | Memory |
| 6,283,679 | B1 | 9/2001 | Gregor et al. |
| 7,270,064 | B2 | 9/2007 | Kjelsson et al. |
| 7,380,733 | B2 | 6/2008 | Owenby et al. |
| 7,395,769 | B2 | 7/2008 | Jensen |
| 7,571,688 | B1 | 8/2009 | Friestad et al. |
| 7,617,785 | B2 | 11/2009 | Wendte |
| 7,743,719 | B2 | 6/2010 | Memory |
| 7,925,404 | B2 | 4/2011 | Dillman |
| 7,980,187 | B2 | 7/2011 | Audetter |
| 8,196,534 | B2 | 6/2012 | Meyer et al. |
| 8,235,134 | B2 | 8/2012 | Schilling |
| 2010/0132600 | A1 | 6/2010 | Dean et al. |
| 2011/0132244 | A1 | 6/2011 | Meyer et al. |
| 2012/0227648 | A1 | 9/2012 | Kowalchuk et al. |

\* cited by examiner

PARTICULATE MATERIAL DELIVERY SYSTEM FOR VARIABLE RATE SECTIONAL CONTROL

CROSS-REFERENCE TO RELATED APPLICATION

The present application claims the benefit of U.S. Ser. No. 61/589,565 filed Jan. 23, 2012.

FIELD OF THE INVENTION

The invention relates generally to agricultural systems and, in particular, to particulate material delivery systems that use an air cart-type implement(s) for pneumatically distributing product such as fertilizer and small grains.

BACKGROUND OF THE INVENTION

Modern large acreage seeding implements pneumatically deliver seed, fertilizer, and/or other product to fields. An example is an air cart and an air drill that are pulled together behind a tractor to deliver product. Different seeding styles can be implemented by using different openers on the air drills. Knife, ribbon band, ribbon band sweep, double-shoot, and disk openers can be used for different seeding styles that can open correspondingly different styles of furrows to receive the seed. The air cart pneumatically conveys seed to the air drill for delivery into the furrow(s). Air carts include one or more storage compartments that hold product(s), each of which has an associated metering box. The metering box divides product(s) from the associated storage compartment(s) into equal sections for delivery of equal product volumes. The equally divided product(s) is entrained in an airflow established by a fan and delivered through manifolds and distribution lines that direct the product from the air cart, to the air drill, and to the field being planted with seed.

SUMMARY OF THE INVENTION

The present invention is directed to a particulate material delivery system that allows for variable rate sectional control while delivering particulate material to an agricultural field. The system may be incorporated with air carts and air drills, and that includes a metering system having multiple metering units that are independently controllable. This may allow for individual controlling product delivery rates through metering units so as to independently control the delivery rate(s) to each of multiple secondary distribution headers or manifolds, which may allow for sectional control of product delivery from the air drill.

According to one aspect of the present invention, a particulate material delivery system is provided that may include an air cart and a planter that are towable behind a tractor. A metering system of the particulate material delivery system receives a product from the air cart and delivers the product to the planter for distribution to the ground, such as an agricultural field. The metering system may include multiple metering units that receive separate portions of the product from the air cart. Multiple prime movers may drive the multiple metering units. A controller is connected to and individually controls the multiple prime movers such that distribution rates of the multiple metering units can be varied independently of each other. The multiple prime movers may be electric motors.

According to another aspect, each of the multiple metering units may include a metering roller, and a shaft that supports and rotates the metering roller. The electric motors may directly drive ends of the shafts that support the metering roller.

According to another aspect, each of the multiple metering units may include a metering roller having an external gear at an outer circumferential surface thereof. Each electric motor may directly drive the external gear of a respective metering roller.

According to another aspect, each of the multiple metering units may include a metering roller having an internal gear at an inner circumferential surface thereof. Each electric motor may directly drive the internal gear of a respective metering roller.

According to another aspect, an airflow characteristic of an airflow that entrains the product may be controlled based on a delivery rate of at least one of the multiple metering units for pneumatically conveying product from the multiple metering units toward multiple opener units of the drill. The delivery rate of the product to multiple locations of the agricultural field may be individually controlled by controlling the delivery rate of product through each of the multiple metering units and controlling the airflow characteristic. This may allow for providing a particulate material delivery system that provides delivery consistency and control without requiring singulation-type equipment such as row-unit planters, which may provide a relatively simple and cost-effective air-seeder-type particulate material delivery system with a high amount of delivery accuracy. This may allow for delivery rate variability at secondary headers or manifolds of a single drill which allows for site specific precision farming. This may also allow for relatively more application precision by way of variable rate sectional control of a drill as compared to typical drills that each typically allows for delivery rate variability of only the whole drill.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE INVENTION

Figure 1:
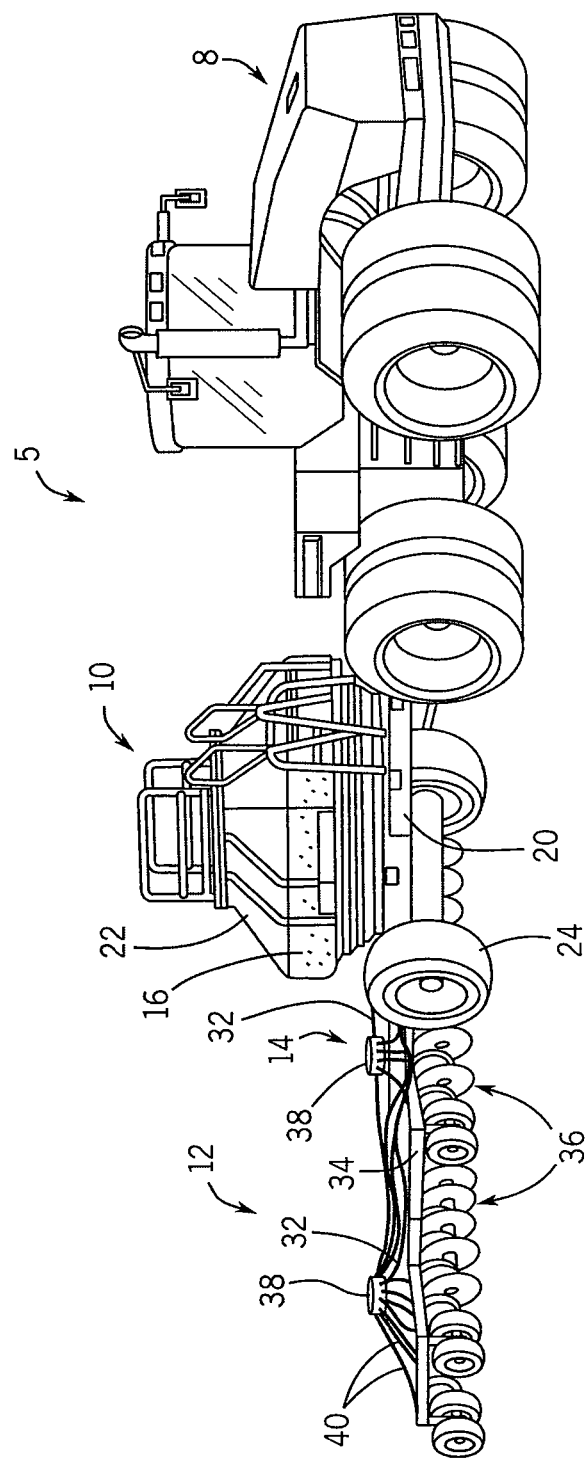
FIG. 1 is a simplified pictorial view of a particulate material delivery system in accordance with the present invention.
Figure 2:
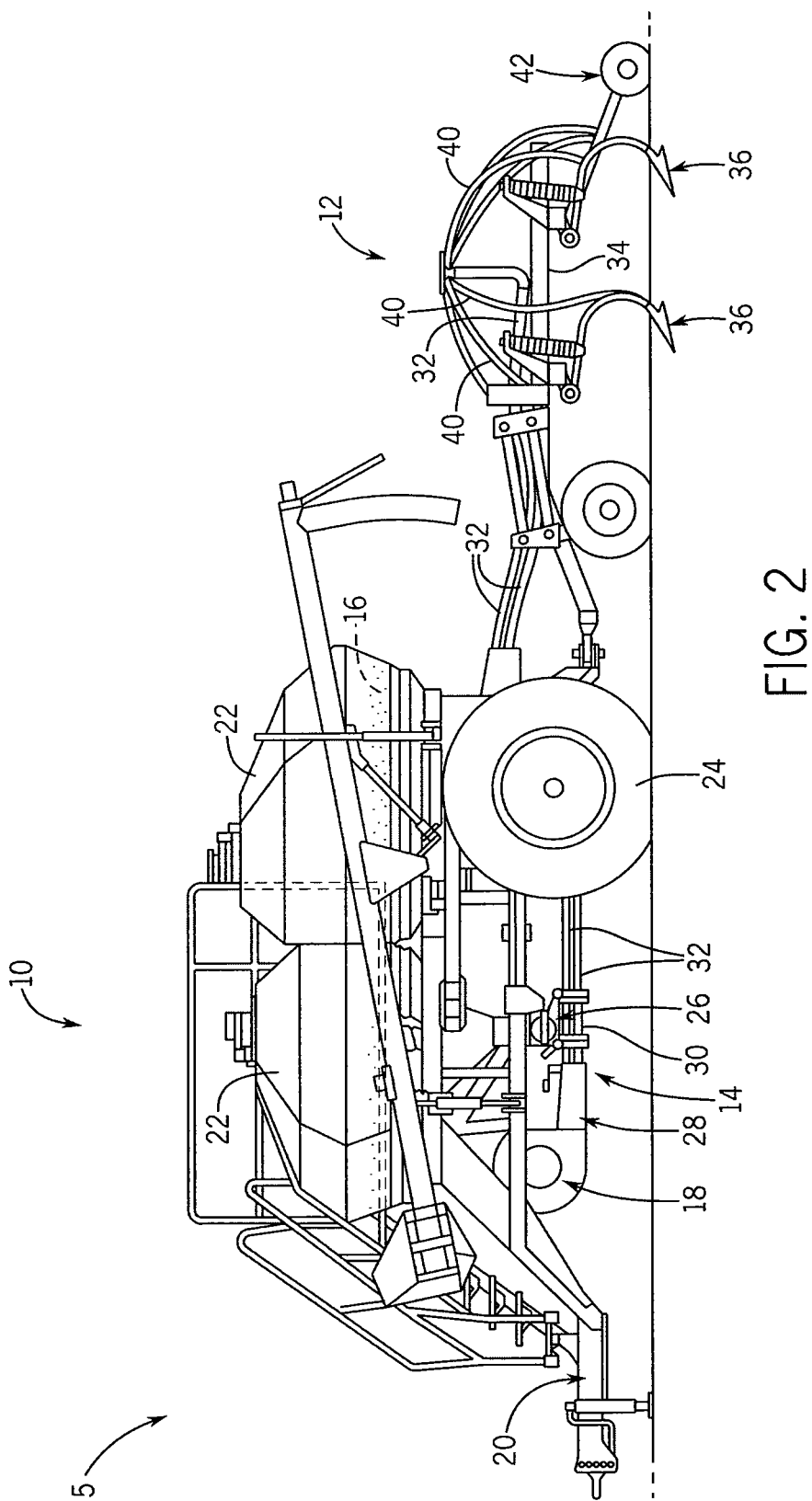
FIG. 2 is a side elevation view of a portion of a variant of the particulate material delivery system of FIG. 1.

Referring to FIG. 1, an agricultural particulate material delivery system 5 is shown that includes a tractor 8, an air cart 10 that may define a seed cart and which is shown as an air cart such as a PRECISION AIR® cart available from the Case IH company, and a drill 12, which is shown as an air drill such as an ATX700 air hoe drill available from the Case IH company. The air cart 10 and the drill 12 are hitched to the tractor 8 and/or each other in a conventional manner. A pneumatic distribution system 14 is arranged with respect to the air cart 10 and the drill 12 for pneumatically delivering product 16 from the air cart 10 to the drill 12 for pneumatic distribution of the product to an agricultural field. The product 16 is a particulate material that may be seed such as small grains and/or fertilizer such as dry granular fertilizer. Referring now to FIG. 2, the pneumatic distribution system 14 includes a fan(s) 18, which may be a centrifugal fan, for generating an airflow(s) that is directed through the pneumatic distribution system 14 to entrain product 16 for pneumatic delivery to the agricultural field.

Referring to FIGS. 1 and 2, the air cart 10 includes a frame 20 to which storage compartments 22 and wheels 24 are mounted. Each storage compartment 22 has an associated metering system 26 (FIG. 2) arranged at its lower end for receiving product 16 from the storage compartment 22. Each metering system 26 is configured for segmented control thereof to allow for controlled feeding of product 16 into the airflow(s) generated by the fan(s) 18 so that product 16 may be distributed at different delivery rates to different portions of the drill 12 by way of controlling how much product 16 is delivered into separate segments of or in fluid communication with the primary distribution manifold 30 for controlled variation of delivery rate of the product 16 to different locations on the agricultural field. The airflow(s) from the fan(s) 18 is directed by a plenum 28 to a primary distribution manifold 30 that includes individual passages which divide the airflow into separate airflows or airflow segments that are each connected by a first distribution line(s), shown as primary distribution lines 32 that extend toward the drill 12.

The drill 12 includes a frame 34 to which a set of opener units 36 is coupled. FIG. 1 shows disc-style opener units 36, whereas FIG. 2 shows tip-type opener units 36. The opener units 36 are configured to cut a furrow into the soil. A secondary distribution manifold(s) 38 is arranged on the drill 12 and is respectively connected to the primary distribution line(s) 32. A second distribution line(s), shown as secondary distribution lines 40, connects the secondary distribution manifold 38 to individual outlets for delivery of seed at each furrow created in the agricultural field by each opener unit 36, allowing the pneumatic distribution system 14 to pneumatically deliver the product 16 from the air cart 10 into the furrows cut by the opener units 36. Seed row finishing equipment such as wheel packers or closing wheels 42 may be arranged on the drill 12, such as the embodiment shown in FIG. 2 foreclosing the furrow(s).

Figure 3:
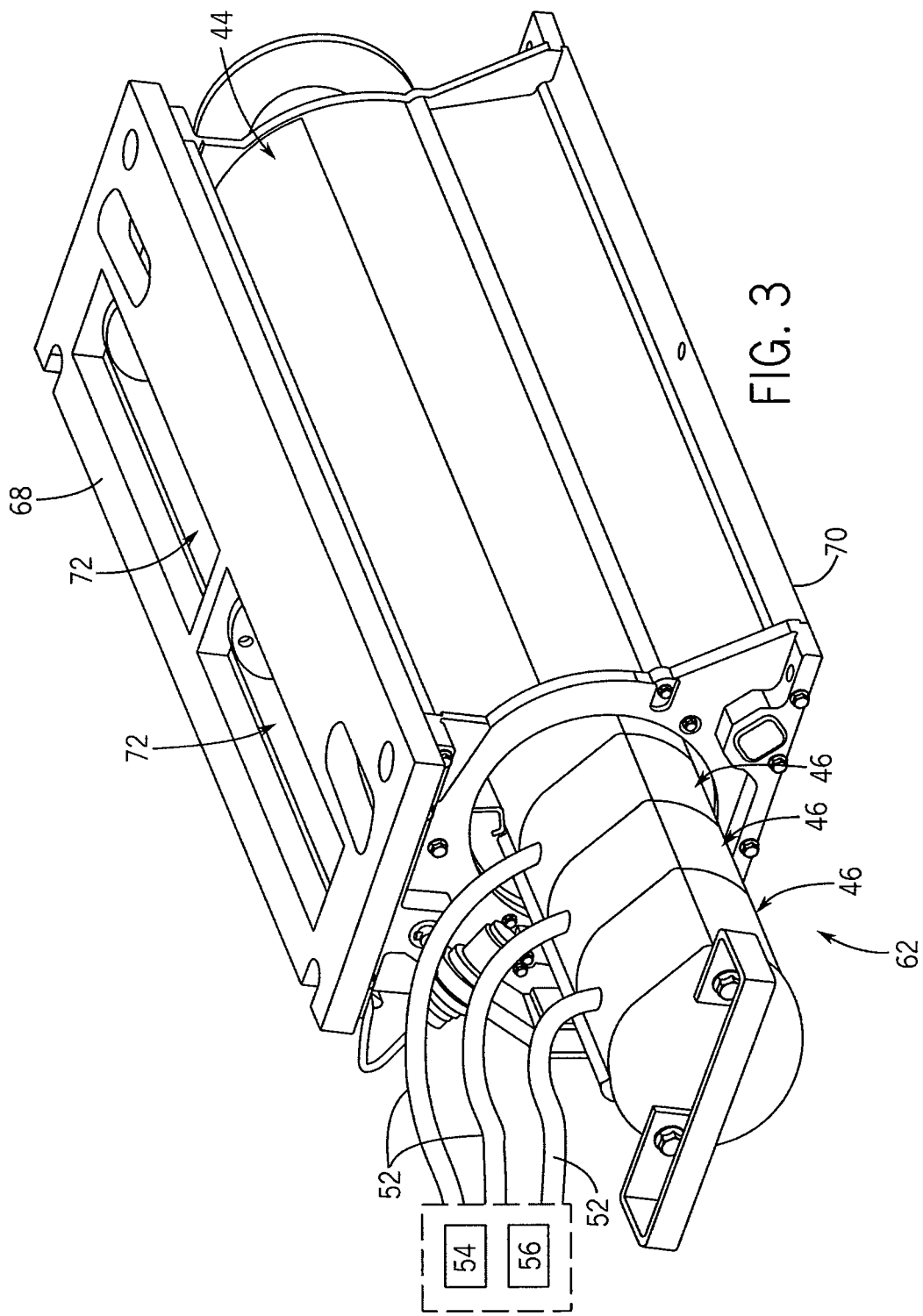
FIG. 3 is a perspective view of a metering system used in the particulate material delivery system of FIG. 2 with the metering cartridge partially removed.
Figure 8:
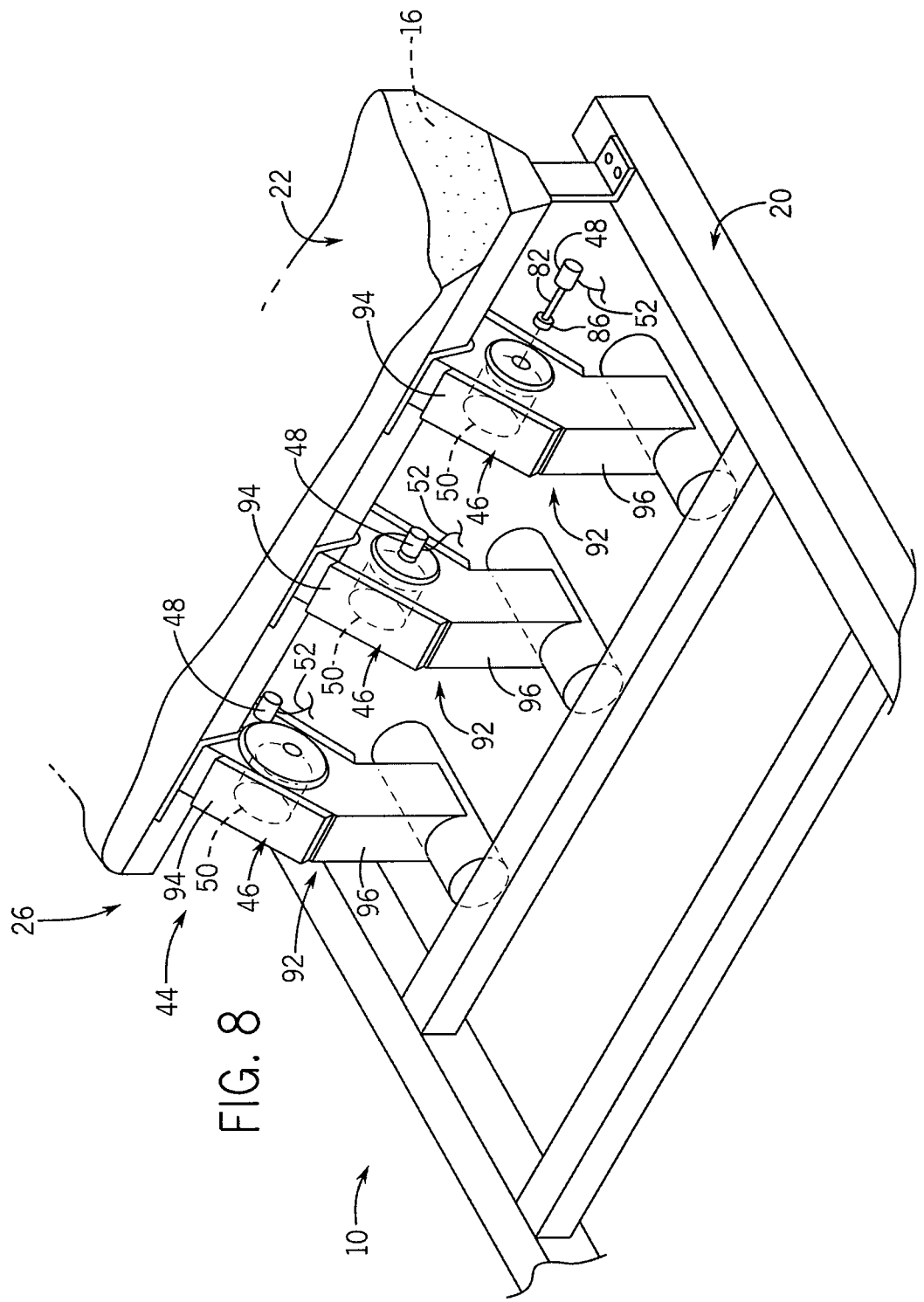
FIG. 8 is a perspective view of a metering system according to another embodiment of the invention.

Referring now to FIGS. 2 and 8, each metering system 26 includes a housing 44 in communication with the storage compartment 22. Referring now to FIGS. 3 and 8, product 16 (FIG. 1) from the storage compartment 22 is directed to the housing 44 where it is divided between and delivered to multiple individually controlled metering units 46, explained in greater detail elsewhere herein. The metering units 46 are individually driven by separate prime movers 48 so that individual metering rollers 50 of the individual metering units 46 can each be rotated at variable speeds. Each prime mover 48 may be, for example, a hydraulic motor, but is preferably an electric motor and, more preferably, a 12V DC electric motor. Conductors 52 operatively connect each prime mover 48 to a controller 54 and a power supply 56 (FIGS. 3, 4, and 6) which can be electrically connected to the 12V DC electrical system of the tractor 8. The controller 54 is further operatively connected, in a conventional manner, to any of a variety of suitable sensors for sensing, e.g., travel velocity of the air cart 10, and/or other operating characteristics and which allows for automatic control of the system 5 by way of the controller 54 for variable rate sectional control while delivering the product 16 to the agricultural field. The controller 54 can include an industrial computer or, e.g., a programmable logic controller (PLC), along with corresponding software and suitable memory for storing such software and hardware, including interconnecting conductors for power and signal transmission for controlling electronic, electro-mechanical, or other components of the pneumatic distribution system 14 and/or metering system 26. The controller 54 can evaluate the operating characteristics of the particulate material delivery system 5 or its components to determine the desired delivery rate of product from each of the metering units 46 and, thus, product delivery rate from each of multiple portions of the drill 12. The controller 54 controls the particular speed at which each metering roller 50 is driven and, thus, rates at which product is delivered may be varied as a function of the operating conditions including, but not limited to, the ground speed or travel velocity of the air cart 10, the length of the distribution lines 32 or 40, or the topology of the field, such as a curved row. In one embodiment, the controller 54 controls the fan 18 to vary the fan rotational speed, e.g., increase or decrease, and correspondingly vary the air flow characteristics such as mass flow rate or volume based on the delivery rate variation of the metering units 46, so as to, for example, match air flow rate with product delivery rate. In another embodiment, the controller 54 varies the air flow rate by actuating a damper 58 (FIG. 6) that regulates flow rate in each of the plenums 28 in addition to or in lieu of varying the fan speed of fan 18. Controller 54 can individually control actuation of the dampers 58 by, for example, energizing respective actuators 60 so that different airflow rates can be provided through the different plenums 28 while all being supplied from a single fan 18. Regardless of the particular controlling parameters, each metering unit 46 of the metering system 26 may be directly driven by the prime mover 48 by way of one of an internal drive arrangement with respect to the metering roller 50, and external drive arrangement with respect to the metering roller 50, or an end-shaft driving arrangement with respect to the roller 50, as explained in greater detail elsewhere herein.

Figure 4:
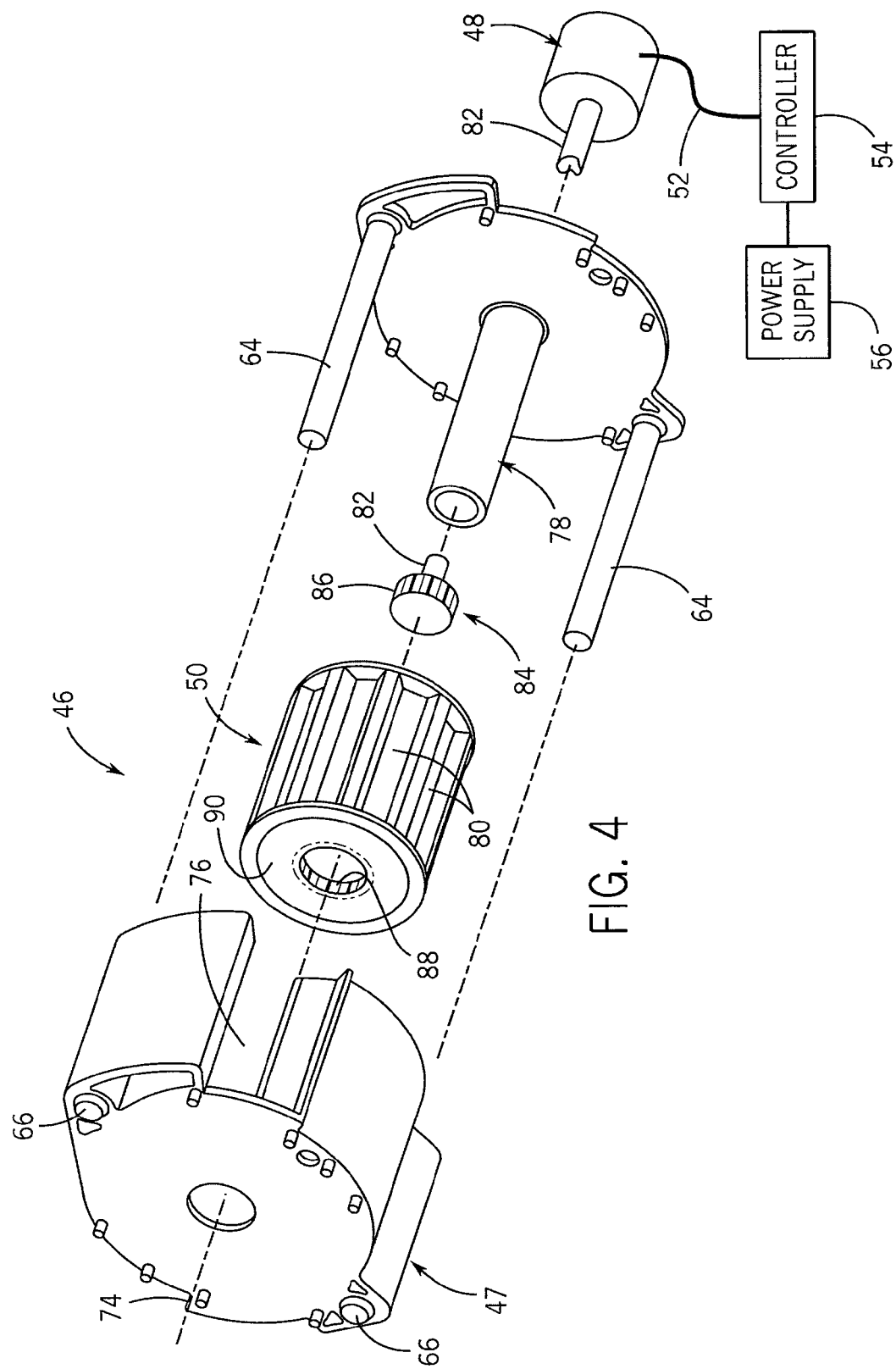
FIG. 4 is an exploded view of a metering unit of the metering system of FIG. 3.
Figure 5:
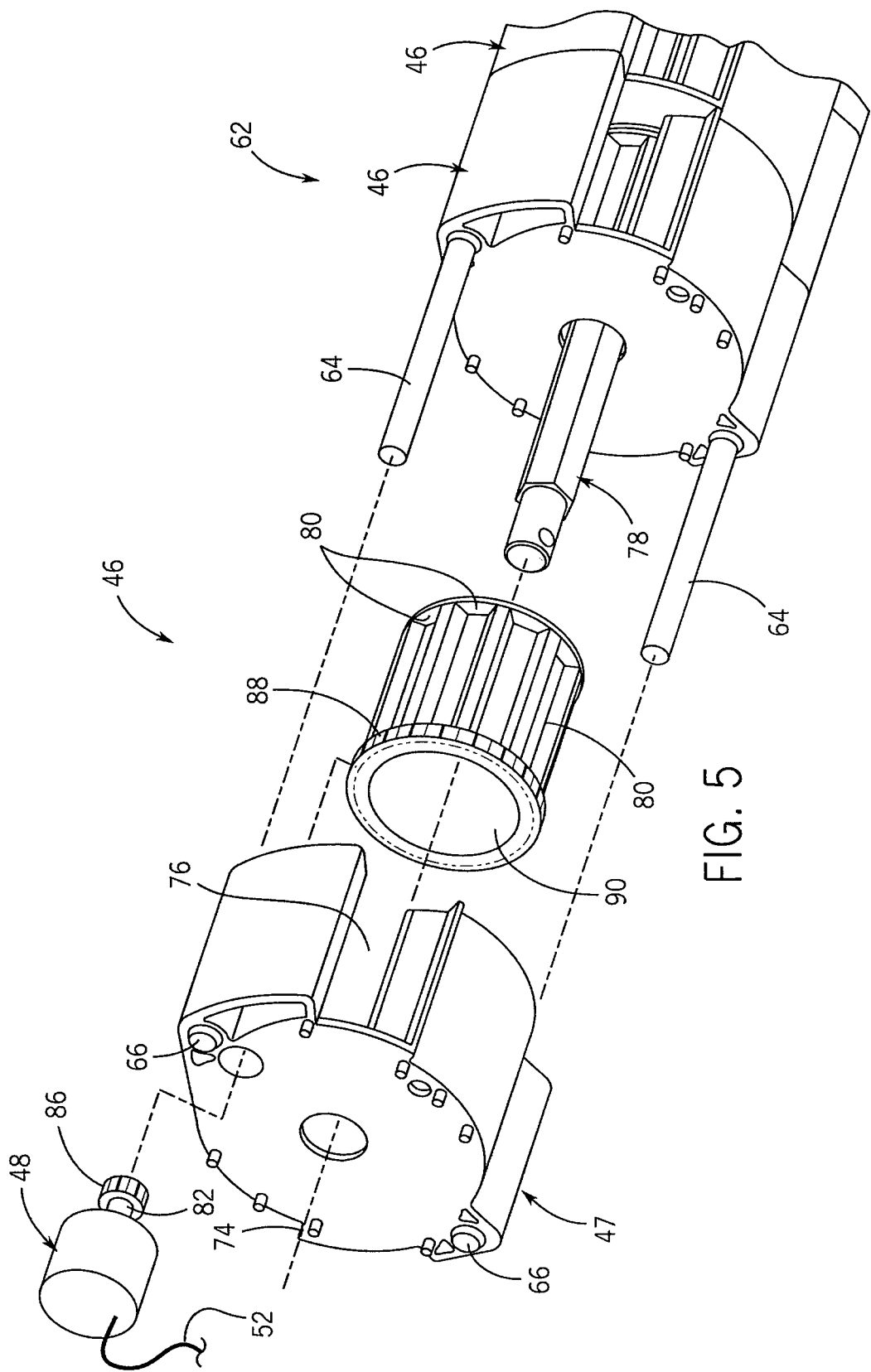
FIG. 5 is an exploded view of a variant of the metering unit of FIG. 4.

Referring now to FIG. 3, the metering system 26 of this embodiment defines a cartridge-type configuration, represented as a cartridge 62 that is defined by multiple adjacent metering units 46. As shown in FIGS. 4 and 5, each metering unit 46 is mounted adjacent to another metering unit 46 via bolts 64 passing through opening 66 in each metering unit 46. Within the cartridge 62, each metering unit 46 may release product 16 (FIG. 1) for delivery to an individual row of the drill 12 or each metering unit 46 may release product 16 for delivery to multiple rows of the drill 12. Referring again to FIG. 3, the housing 44 in which the cartridge 62 is arranged in this embodiment has an upper surface 68 coupled to the storage compartment 22 (FIG. 2) and a lower surface 70 coupled to the primary distribution manifold 30 (FIG. 2). An inlet passage 72 is defined in the upper surface 68 through which product 16 (FIG. 1) is received from the storage compartment 22 into the housing 44.

Referring now to FIGS. 4 and 5, each metering unit 46 includes a housing 47 with an intake 74 in communication with the housing inlet passage 72 and an exit 76 through which the product 16 passes to the primary distribution manifold 30. The metering roller 50 of each metering unit 46 is arranged between the intake 74 and exit 76 and may be supported by a shaft 78 extending concentrically through the metering roller 50. The metering roller 50 defines a drum-like shape and includes multiple compartments 80 arranged at an outer circumferential surface of the metering roller 50, shown as extending into the outer circumferential surface. The compartments 80 are sized to convey and control the volume and rate of product transferred through the metering unit 46 for delivery out of the exit 76 to be entrained in the airflow of and carried through the primary distribution lines 32 toward the drill 12 for delivery to the agricultural field.

Referring next to FIG. 4, an embodiment of the metering unit 46 in which the metering roller 50 is internally driven is illustrated. In the illustrated embodiment, a single metering unit 46 is shown with the prime mover 48 that is aligned with and mounted directly to the shaft 78. An output shaft 82 of the prime mover 48 extends through an axial bore of the shaft 78. The shaft 78 may further include a retaining member within the shaft 78, such as a clip or a hole extending through the shaft 78 through which a retaining member, such as a screw or bolt, may be passed, securing the prime mover output shaft 82 within the shaft 78. The prime mover output shaft 82 may be oriented within the shaft 78 such that an output shaft end 84 extends beyond the shaft 78. An output gear 86 is then mounted on the output shaft end 84, external to the shaft 78. A metering gear 88 is arranged within the metering roller 50 and defines a tooth inner circumferential surface of a flange 90 at an end of the metering roller 50 which is driven by rotation of the output gear 86. The output gear 86 may occupy the entire space within the metering gear 88 such that the output and metering gears 86, 88 define a splined-type engagement for a one-to-one drive ratio, or the output gear 86 may be smaller than the metering gear 88 to provide other drive ratios. In one embodiment, an intermediate gear(s) may be arranged between the output gear 86 and metering gear 88 to provide the desired drive ratio. The conductors 52 may extend out the end of the shaft 78 opposite the end from which the output shaft end 84 extends and operatively connect the prime mover 48 to the controller 54 and the power supply 56.

Figure 6:
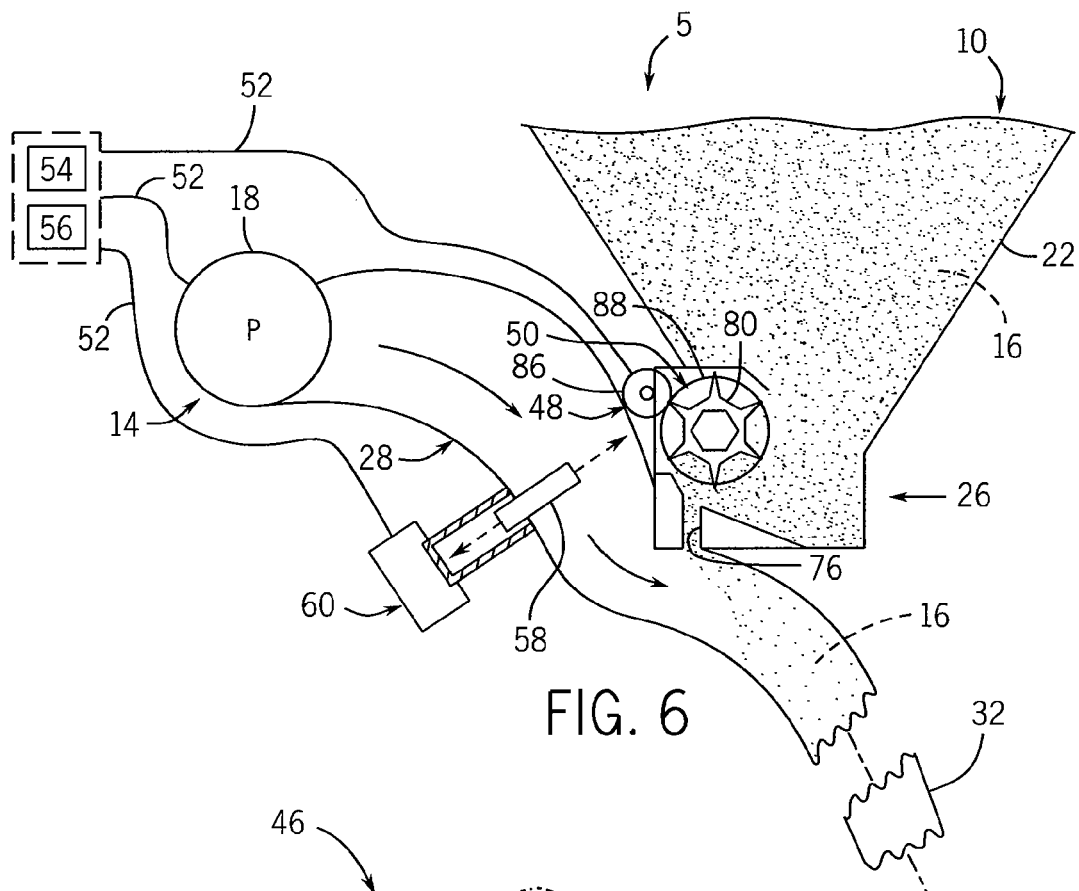
FIG. 6 is a schematic sectional representation of a metering system incorporating the metering unit of FIG. 5.

Referring now to FIGS. 5 and 6, in this embodiment, an embodiment of the metering unit 46 in which the metering roller 50 is externally driven is illustrated. The metering unit 46 and its components are substantially identical as that described with respect to FIG. 4. Accordingly, those descriptions are applicable here with respect to the metering unit 46 shown in FIGS. 5 and 6. The difference is that instead of being internally driven, the metering roller 50 of FIGS. 5 and 6 is externally driven. Accordingly, the metering gear 88 is provided outside of or at an outer circumferential surface of the flange 90 at the end of the metering roller 50. The prime mover 48 is not axially aligned with the shaft 78 but is instead transversely spaced from the shaft 78. The output gear 86 of the prime mover 48 is radially aligned with the metering gear 88. As illustrated, the output gear 86 can directly engage the metering gear 88; optionally, an intermediate gear(s) may be provided therebetween.

Figure 7:
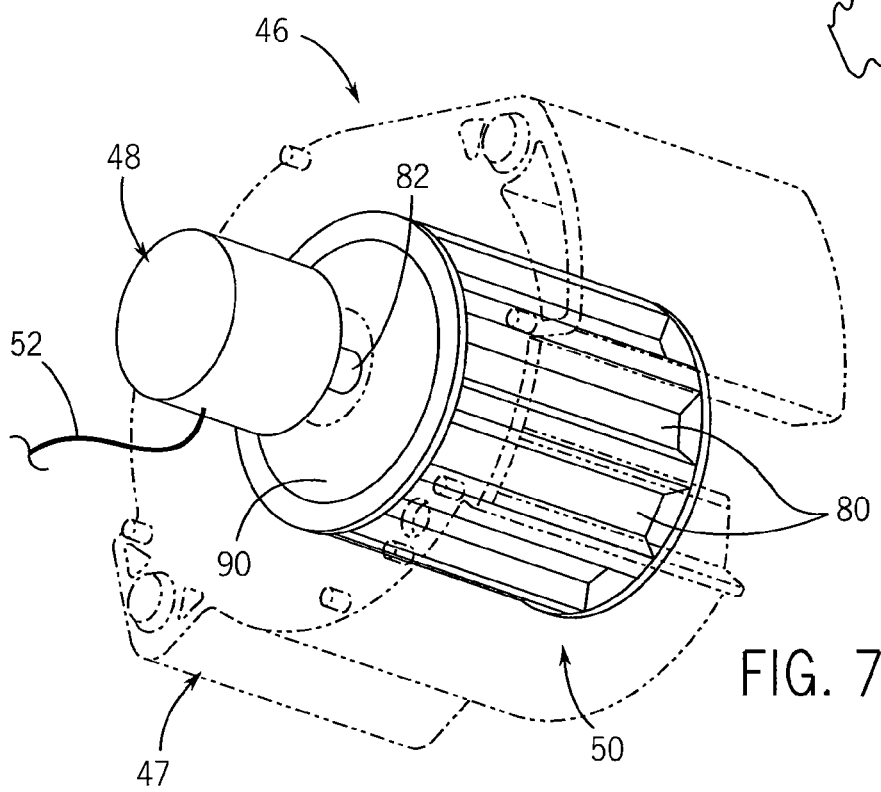
FIG. 7 is schematic representation of another variant of the metering unit of FIG. 4.

Referring next to FIG. 7, in this embodiment, an embodiment of the metering unit 46 in which the metering roller 50 is end-shaft driven is illustrated. The metering unit 46 and its components are substantially identical as that described with respect to FIG. 4. Accordingly, those descriptions are applicable here with respect to the metering unit 46 shown in FIG. 7, although being shown in a more simplified and schematic representation. The difference is that instead of being internally driven, the metering roller 50 of FIG. 7 is driven directly by an end of the output shaft of the prime mover 48. Accordingly, a metering gear 88 is not required in this embodiment. Instead, the output shaft 82 of the prime mover 48 is axially aligned with and connected to the center of the flange 90, shown as being circular, at an end of the metering roller 50. In another embodiment of the end-shaft driven arrangement, the shaft 78 is fixed to the metering roller 50 so that the shaft 78 and metering roller 50 rotate in unison with each other. In such embodiment, the output shaft 82 of the prime mover 48 may be coupled to and rotates an end of the shaft 78 of the metering roller 50, either as an end-to-end axial coupling or through one or radially intermediate gears.

Referring next to FIG. 8, unlike the embodiment of FIG. 3, in this embodiment, the housing 44 of the metering system 26 is constructed in multiple housing segments 92. Each housing segment 92 of this embodiment includes, for example, an upper portion 94 to receive product 16 (FIG. 1) from the storage compartment 22 and a lower portion 96 that extends between and connects the upper portion 94 and a primary distribution line 32. The metering units 46 in FIG. 8 are substantially identical to metering units 46 described above with respect to FIGS. 3-7. Accordingly, the description of such metering units 46 and their components in FIGS. 3-7 is applicable here with respect to the metering units 46 shown in FIG. 8. However, unlike the metering units 46 of FIGS. 3-7, the metering units 46 of FIG. 8 are not interconnected with each other to define a cartridge 62. Instead, the metering units of 46 of FIG. 8 are separately arranged in respective ones of the housing segments 92, shown here as arranged in the upper portions 94 of the segments 92. This arrangement permits access to individual metering units 46 for repair and/or exchange without removing all of the metering units 46 from their respective individual mountings with the other housing segments 92.

Still referring to FIG. 8, the metering units 46 separately receive product 16 through the upper portions 94 of the housing segments 92 and meter out the product 16 through the lower portions 96 by rotating the metering rollers 50 to deliver the product 16 into the airflows flowing through the primary distribution line 32 in a controlled manner. Three different exemplary arrangements for driving the metering rollers 50 of the metering units 46 with the prime movers 48 are shown in FIG. 8. These are (i) an external driving arrangement shown at the left-most metering unit 46, (ii) an end-shaft driving arrangement shown at the middle metering unit 46, and (iii) an internal driving arrangement shown at the right-most metering unit 46.

Still referring to FIG. 8, the external driving arrangement at the left-most metering unit 46 may be a substantially identical arrangement to that shown in FIGS. 5 and 6, whereby the description of the metering unit 46 in FIGS. 5 and 6 is applicable here with respect to the left-most metering unit 46 of FIG. 8. The left-most metering unit 46 of FIG. 8 and with reference to FIGS. 5 and 6, the prime mover 48 is transversely spaced with the central axis of the metering roller 50. Such metering unit 46 is arranged with the prime mover 48 driving an outer rim, for example, a metering gear 88, of the metering roller 50 by engaging teeth at the outer circumferential surfaces of the metering roller 50 and output gear 86 of the prime mover 48.

Referring again to FIG. 8, the end-shaft driving arrangement of the metering unit 46 shown in the middle may be a substantially identical arrangement to that shown in FIG. 7, whereby the description of the metering unit 46 in FIG. 7 is applicable here with respect to the middle metering unit 46 of FIG. 8. The middle metering unit 46 of FIG. 8 and with reference to FIG. 7 includes an output shaft 82 that is generally axially aligned with and coupled to the flange 90 at an end of the metering roller 50, or a shaft 78 extending concentrically through for rotating the metering roller 50.

Referring again to FIG. 8, the internal driving arrangement at the right-most metering unit 46 may be a substantially identical arrangement to that shown in FIG. 4, whereby the description of the metering unit 46 in FIG. 4 is applicable here with respect to the right-most metering unit 46 of FIG. 8. The right-most metering unit 46 of FIG. 8 and with reference to FIG. 4 is arranged so that the output gear 86 of the prime mover 48 engages and drives an inner circumferential surface of a metering gear 88 of the metering roller 50.

Figure 9:
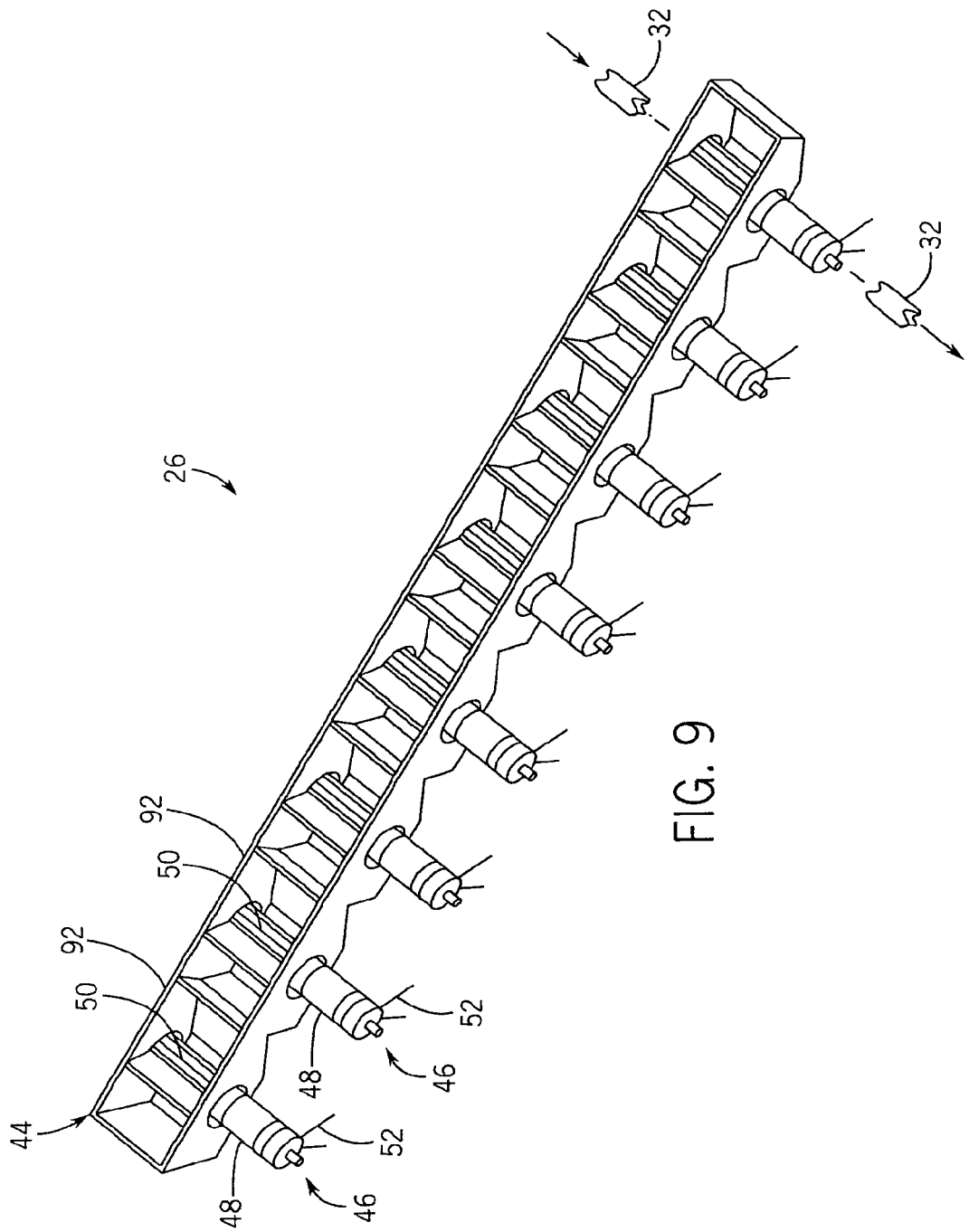
FIG. 9 is a perspective view of a variant of the metering system of FIG. 8.
Figure 10:
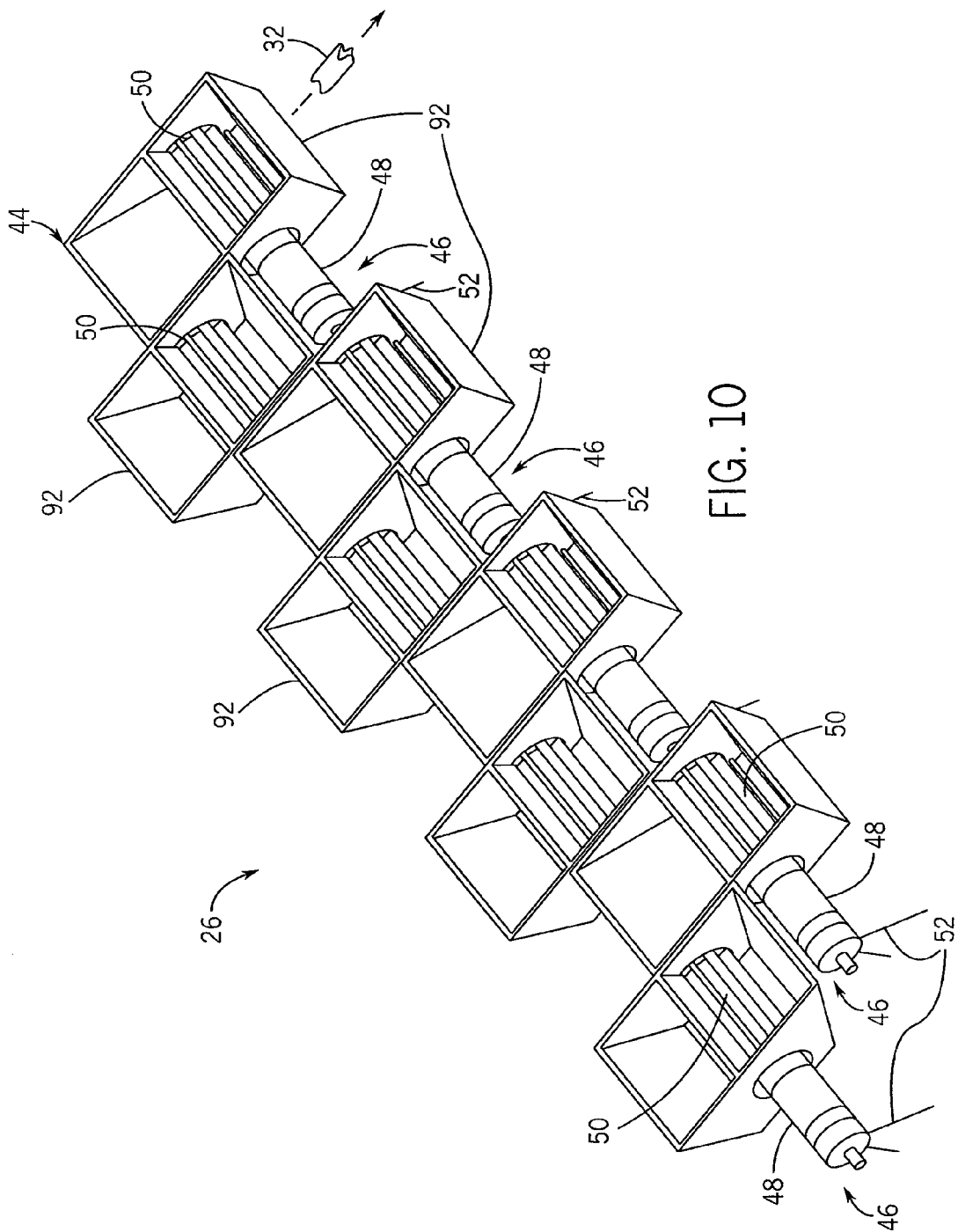
FIG. 10 is a perspective view of another variant of the metering system of FIG. 8.

Referring now to FIGS. 9 and 10, like the embodiment of FIG. 8, the housing 44 of the metering system 26 in each of these embodiments includes multiple housing segments 92 that individually deliver product 16 to the individual metering units 46. Referring to FIG. 9, the housing 44 has housing segments 92 that are transversely aligned with and adjacent to each other and the metering roller(s) 50 may be arranged parallel to the primary distribution line(s) 32, only one shown schematically, that receives the product 16 (FIG. 1) from the metering unit. Referring to FIG. 10, the housing 44 has housing segments 92 that are generally longitudinally aligned with each other and transversely staggered. In this way, the prime mover 48 of one metering unit 46 may extend under a housing segment 92 of an adjacent metering unit 46, and the metering roller(s) 50 may be arranged perpendicular to the primary distribution line(s) 32.

In light of the above, during use, the product 16 (FIG. 1) is received from the storage compartment(s) 22, through the inlet passage 72, into the housing 44 of the metering system 26. Simultaneously, an opener unit 36 opens a trough or furrow in the agricultural field to receive the product 16. The prime mover 48 rotates the metering roller 50 at each of the metering units 46. As the metering roller 50 rotates past the intake 74 of the metering unit 46, product fills each compartment 80. As the metering roller 50 rotates past the exit 76 of the metering unit 46, the product empties from each compartment 80 into the primary distribution manifold 30 or a primary distribution line(s) 32 of the pneumatic distribution system 14 to be distributed to each of the furrows opened by the opener units 36. As the drill 12 advances further, the closing wheels 42 close each furrow with the product therein.

All the while, the controller 54 monitors numerous operating conditions to determine the proper rotational speed of each metering roller 50, optionally, to determine the proper fan rotational speed of fan 18 and/or position of damper 58 (FIG. 6) to achieve a proper airflow rate for each of the metering units 46. In this way, the controller 54 may individually control delivery rates of the multiple metering units 46, independently of each other, as well as individually control an airflow characteristic of an airflow for each of the multiple metering units 46. The controller 54 may be configured to automatically control the multiple metering units 46 independently of each other and/or airflow characteristics so as to provide variable rate sectional control while delivering the product 16 to the agricultural field. This allows the controller 54 to separately control delivery rate of product 16 to at least some of the multiple locations of the agricultural field, for example, corresponding to locations of the opener units 36, which may be done automatically. This may be done by the controller 54 individually controlling the delivery rate of product 16 through each of the multiple metering units 46, and which may include individually controlling an airflow characteristic of an airflow for each of the multiple metering units 46 such that airflows entraining product from the multiple metering units 46 are each controlled based on the delivery rate of the respective one of the multiple metering units 46. In one embodiment, the airflow characteristic(s) may be controlled based on a delivery rate of more than one of the metering units 46. Furthermore, the airflow characteristic(s) may be controlled based on a delivery rate of a metering unit 46 that has a greatest delivery rate when compared to the other metering units 46. In one embodiment, the rotational speed may be a function of the ground speed or travel speed of the drill 12 and a desired seed depositing rate from the seed metering system 26. Thus, as the tractor 8 and, consequently, the drill 12 increases or decreases speed, the controller 54 may correspondingly increase or decrease the commanded rotational speed of each of the output shafts 82 of the prime movers 48 and, thus, the metering rollers 50, optionally, air flow rate by way of damper 58 and/or rotational speed of fan 18, to maintain a consistent seed depositing rate. Similarly, certain ground conditions may require an increase or a decrease in the seed depositing rate of the metering rollers 50. Therefore, even if the tractor 8 maintains a uniform speed, the controller 54 may monitor the ground conditions, for example, via sensors or from a preprogrammed map and a global positioning system (GPS) coordinate, to adjust the rotational speed of the drive mechanisms as a function of the ground conditions. Accordingly, the seed metering system 26 receives commands for each metering unit 46, preferably, at a variable rate and, more preferably, at an infinitely variable rate, based at least in part on the ground speed or the drill 12 or the ground conditions.

Furthermore, in one embodiment, a single controller 54 controls all of the metering units 46. Doing so can ensure that each metering unit 46 receives the same control signals, whereby the resultant output responses should be substantially analogous, when that is desired. This can enhance uniformity of seed placement between the individual rows and other operating characteristics.

However, controller 54 can also provide separate rotational speed commands to each individual metering unit 46 independently of the other speed commands and other metering unit(s) 46. In such configuration, each metering unit 46 can be activated and deactivated independently of each other, whereby overplanting can be managed and minimized. Accordingly, when using row crop planting techniques such as, e.g., planting point rows, turn rows, headland rows, or end rows, or in other situations which could lead to double planting or other overplanting conditions, the operator or controller 54 can de-energize and thus disengage any one or more of the individual metering units 46, as desired. This enables the user and/or controller 54 to comprehensively manage the application of seed, on a per-row planting unit and, thus, per-row basis. As still another option, multiple controllers 54 may monitor conditions and provide rotational speed or other commands to a portion of the metering units 46.

It is further contemplated that varying rotational speed commands may be provided to metering units 46 according to which row on the drill 12 the respective metering unit(s) 46 is connected. For example, outer rows require longer secondary distribution lines 40 than central rows. Thus, the time required for product to travel from the metering system 26 to the outlet of each row on the drill 12 varies. Further, air pressure variation as a function of the length of the distribution lines, 32 and 40, may result in varying dispersal rates at the outlet of each row. Thus, the controller 54 may provide varying rotational speed commands to metering units 46 at particular rows on the drill 12 to produce a uniform output at the outlets of each row on the drill 12 and a uniform dispersion to the ground.

In addition, the controller 54 may vary, for example, automatically vary, the rotational speed commands to each metering unit 46 during a turn. As the tractor 8 and, subsequently, the drill 12, turn a corner, those rows along the inner radius of the turn travel a shorter distance than those rows along the outer radius of the turn. Thus, the controller 54 may increase the rotational speed command to prime movers 48 of metering units 46 supplying product to outer rows, decrease the rotational speed command to drive the prime movers 48 of metering units 46 supplying product to inner rows, or a combination thereof. Controller 54 may vary the rotational speed of fan 18 and/or the position of the damper 58 so as to vary the air flow characteristic(s) accordingly.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A particulate material delivery system comprising:
   an air cart and a drill that are towable behind a tractor;
   a pneumatic distribution system arranged with respect to the air cart and the drill, the pneumatic distribution system including multiple distribution lines configured to pneumatically deliver a product to the drill for pneumatic distribution to the agricultural field;
   a metering system receiving the product from the air cart and delivering the product to the multiple distribution lines, the metering system including,
   multiple metering units receiving separate portions of the product from the air cart and transmitting each separate portion of the product to a corresponding one of the multiple distribution lines;
   multiple prime movers driving the multiple metering units; and
   a controller connected to and individually controlling the multiple prime movers for controlling the rate at which the multiple metering units transmit the separate portions of the product to the corresponding multiple distribution lines independently of each other;
   wherein:
   the pneumatic distribution system includes at least one fan that provides air flow in at least one distribution line for pneumatically delivering at least one separate portion of product to the drill for pneumatic distribution to the agricultural field; and
   the controller operatively connected to and controlling a speed of the at least one fan.

2. The particulate material delivery system of claim 1 wherein the multiple prime movers are electric motors.

3. The particulate material delivery system of claim 2 wherein each of the multiple metering units includes a metering roller, and a shaft that supports and rotates the metering roller, and wherein each electric motor drives an end of the shaft that supports a respective metering roller.

4. The particulate material delivery system of claim 2 wherein each of the multiple metering units includes a metering roller having an external gear at an outer circumferential surface thereof, and wherein each electric motor directly drives the external gear of a respective metering roller.

5. The particulate material delivery system of claim 2 wherein each of the multiple metering units includes a metering roller having an internal gear at an inner circumferential surface thereof, and wherein each electric motor directly drives the internal gear of a respective metering roller.

6. The particulate material delivery system of claim 1 wherein the air cart defines a seed cart and the drill defines an air drill cooperating with the pneumatic distribution system for entraining the product in at least one airflow for continuous pneumatic conveyance of the product from the metering system to the agricultural field.

* * * * *